(12) United States Patent
van Dijk

(10) Patent No.: US 10,838,906 B1
(45) Date of Patent: Nov. 17, 2020

(54) COMMUNICATION BETWEEN TRANSCEIVER AND MICROCONTROLLER

(71) Applicant: NXP B.V., Eindhoven (NL)

(72) Inventor: Lucas Pieter Lodewijk van Dijk, Kranenburg (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/509,304

(22) Filed: Jul. 11, 2019

(51) Int. Cl.
*G06F 13/00* (2006.01)
*G06F 13/42* (2006.01)

(52) U.S. Cl.
CPC ...... *G06F 13/42* (2013.01); *G06F 2213/0062* (2013.01)

(58) Field of Classification Search
CPC .......................... G06F 13/42; G06F 2213/0062
See application file for complete search history.

(56) References Cited

U.S. PATENT DOCUMENTS

| | | | | |
|---|---|---|---|---|
| 4,813,040 A | * | 3/1989 | Futato | H04J 3/1682 370/477 |
| 4,866,702 A | * | 9/1989 | Shimizu | H04L 12/44 370/438 |
| 5,509,012 A | * | 4/1996 | Chung | G06F 13/385 370/431 |
| 6,604,038 B1 | * | 8/2003 | Lesesky | G07C 5/008 340/988 |
| 2004/0120356 A1 | * | 6/2004 | Davenport | H04B 3/54 370/516 |
| 2005/0016787 A1 | * | 1/2005 | Lesesky | G07C 5/008 180/311 |
| 2005/0180442 A1 | * | 8/2005 | Birsan | H04L 41/082 370/410 |
| 2014/0365693 A1 | * | 12/2014 | Monroe | H04L 12/40032 710/105 |
| 2020/0073774 A1 | * | 3/2020 | Deb | H04L 12/40032 |
| 2020/0084064 A1 | * | 3/2020 | Hartwich | H04L 12/40013 |
| 2020/0117632 A1 | * | 4/2020 | Mutter | G06F 13/409 |

* cited by examiner

*Primary Examiner* — Jing-Yih Shyu
(74) *Attorney, Agent, or Firm* — Rajeev Madnawat

(57) ABSTRACT

A transceiver configured to send and receive data over a data bus is disclosed. The transceiver includes a communication port to connect to the data bus, a bus idle detector configured to detect when the data bus is idle, a TXDC interface configured to selectively receive and send data and an RXDC interface configured to send data. The transceiver also includes a switch controlled by an output of the bus idle detector. The switch is configured to cause the TXDC interface to be used for sending data out when the bus idle detector detects that the data bus is idle.

20 Claims, 6 Drawing Sheets

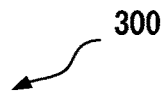

| b4 | b3 | b2 | b1 | b0 | Content |
|---|---|---|---|---|---|
| 0 | 0 | 0 | 0 | 0 | No errors detected |
| 0 | 0 | 0 | 0 | 1 | Transceiver shutdown due to overtemperature |
| 0 | 0 | 0 | 1 | 0 | Transceiver shutdown due to supply error |
| 0 | 0 | 0 | 1 | 1 | Transceiver operating in fail degraded mode due to internal error |
| 0 | 0 | 1 | 0 | 0 | reserved |
| 0 | 0 | 1 | 0 | 1 | reserved |
| 0 | 0 | 1 | 1 | 0 | reserved |
| 0 | 0 | 1 | 1 | 1 | Transceiver temperature above warning level |
| 0 | 1 | 0 | 0 | 0 | Internal oscillator out of range |
| 0 | 1 | 0 | 0 | 1 | Internal supply voltage 1 too low |
| 0 | 1 | 0 | 1 | 0 | Internal supply voltage 2 too low |
| 0 | 1 | 0 | 1 | 1 | Internal supply voltage 1 too high |
| 0 | 1 | 1 | 0 | 0 | Internal supply voltage 2 too high |
| 0 | 1 | 1 | 0 | 1 | Bias current out of range |
| 0 | 1 | 1 | 1 | 0 | Voltage monitor 1 not functional |
| 0 | 1 | 1 | 1 | 1 | Voltage monitor 2 not functional |
| 1 | 0 | 0 | 0 | 0 | Oscillator monitor not functional |
| 1 | 0 | 0 | 0 | 1 | Bias current monitor not functional |
| 1 | 0 | 0 | 1 | 0 | reserved |
| 1 | 0 | 0 | 1 | 1 | reserved |
| 1 | 0 | 1 | 0 | 0 | reserved |
| 1 | 0 | 1 | 0 | 1 | CANH open |
| 1 | 0 | 1 | 1 | 0 | CANH shorted to Battery |
| 1 | 0 | 1 | 1 | 1 | CANH shorted to VCC |
| 1 | 1 | 0 | 0 | 0 | CANH shorted to ground |
| 1 | 1 | 0 | 0 | 1 | CANL open |
| 1 | 1 | 0 | 1 | 0 | CANL shorted to Battery |
| 1 | 1 | 0 | 1 | 1 | CANL shorted to VCC |
| 1 | 1 | 1 | 0 | 0 | CANL shorted to ground |
| 1 | 1 | 1 | 0 | 1 | CANH shorted to CANL |
| 1 | 1 | 1 | 1 | 0 | Recessive voltage above threshold |
| 1 | 1 | 1 | 1 | 1 | Reserved |
| 1 | 0 | 0 | 0 | 0 | Reserved |

| b4 | b3 | b2 | b1 | b0 | content |
|---|---|---|---|---|---|
| 0 | 0 | 0 | 0 | 0 | Shutdown transceiver (to accomplish a fail state) |
| 0 | 0 | 0 | 0 | 1 | Activate fail degraded mode |
| 0 | 0 | 0 | 1 | 0 | Initiate self-test of transceiver after completion of current CAN message |
| 0 | 0 | 0 | 1 | 1 | reserved |
| 0 | 0 | 1 | 0 | 0 | reserved |
| 0 | 0 | 1 | 0 | 1 | reserved |
| 0 | 0 | 1 | 1 | 0 | Activate CAN bus diagnotics |
| 0 | 0 | 1 | 1 | 1 | |
| 0 | 1 | 0 | 0 | 0 | |
| 0 | 1 | 0 | 0 | 1 | |
| 0 | 1 | 0 | 1 | 0 | |
| 0 | 1 | 0 | 1 | 1 | |
| 0 | 1 | 1 | 0 | 0 | |
| 0 | 1 | 1 | 0 | 1 | |
| 0 | 1 | 1 | 1 | 0 | |
| 0 | 1 | 1 | 1 | 1 | |
| 1 | 0 | 0 | 0 | 0 | |
| 1 | 0 | 0 | 0 | 1 | |
| 1 | 0 | 0 | 1 | 0 | |
| 1 | 0 | 0 | 1 | 1 | |
| 1 | 0 | 1 | 0 | 0 | |
| 1 | 0 | 1 | 0 | 1 | |
| 1 | 0 | 1 | 1 | 0 | |
| 1 | 0 | 1 | 1 | 1 | |
| 1 | 1 | 0 | 0 | 0 | |
| 1 | 1 | 0 | 0 | 1 | |
| 1 | 1 | 0 | 1 | 0 | |
| 1 | 1 | 0 | 1 | 1 | |
| 1 | 1 | 1 | 0 | 0 | |
| 1 | 1 | 1 | 0 | 1 | |
| 1 | 1 | 1 | 1 | 0 | |
| 1 | 1 | 1 | 1 | 1 | |
| 1 | 0 | 0 | 0 | 0 | |

Fig. 5

COMMUNICATION BETWEEN TRANSCEIVER AND MICROCONTROLLER

BACKGROUND

The modern automobile may have many electronic control units (ECU) for various subsystems such as engine control module, transmission, airbags, antilock braking, cruise control, electric power steering, audio systems, power windows, doors, mirror adjustment, battery and recharging systems for hybrid/electric cars, etc. A communication among these ECUs may be essential. A subsystem may need to control actuators or receive feedback from sensors. The controller area network (CAN) standard was devised to provide standardized communication protocol among these subsystems. CAN is a two-wire, half-duplex, high-speed serial network typically used to provide communications between network nodes without loading down the system microcontroller and typically used in vehicles. A CAN transceiver is the interface between a CAN protocol controller and the physical CAN bus. Other protocols such as FlexRay, CAN-FD, CAN-XL and Local Interconnected Network (LIN) are also used for communication among components in a vehicle or system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a transceiver configured to send and receive data over a data bus is disclosed. The transceiver includes a communication port to connect to the data bus, a bus idle detector configured to detect if the data bus is idle, a TXDC interface configured to selectively receive and send data and an RXDC interface configured to send data. The transceiver also includes a switch controlled by an output of the bus idle detector. The switch is configured to cause the TXDC interface to be used for sending data out when the bus idle detector detects that the data bus is idle.

In another embodiment, a transceiver configured to send and receive data over a data bus is disclosed. The transceiver includes a communication port to connect to the data bus, a bus idle detector configured to detect when the data bus is idle, a TXDC interface configured to receive data, an RXDC interface configured to send data and a control interface configured to selectively receive a control command and sending a data out. The transceiver also includes a switch controlled by an output of the bus idle detector, the switch is configured to cause the control interface to be used for sending data out when the bus idle detector detects that the data bus is idle.

In some examples, the transceiver also includes a bus diagnostics module coupled to the communication port, wherein the bus diagnostics module is configured to analyze the communication port to detect an error and output a diagnostics code that is predefined for the detected error, wherein the diagnostic code is used in the sending data out. If no error is detected, the bus diagnostics module is configured to output a diagnostics code that is predefined for a healthy condition. The transceiver may also include a transceiver diagnostics module configured to monitor internal components and output a diagnostics code that is predefined for the detected error in one or more internal components, wherein the diagnostic code is used in the sending the data out. If no error is detected in the internal components, the transceiver diagnostics module is configured to send a diagnostics code predefined for a healthy condition of the internal components.

In some embodiments, a reporting module may be included that is coupled with the transceiver diagnostics module and the bus diagnostics module to collect diagnostic data and determine a predefined diagnostics code for the collected diagnostics data. The determining a predefined diagnostics code may include performing a lookup in a memory table that includes a mapping of bus parameters and diagnostic codes.

The bus idle detector is configured to detect an idle state of the data bus according to a predefined frame structure for a protocol of communication of the data bus. The data bus is one of a controller area network (CAN) bus, a FlexRay bus, a CAN-FD bus, a CAN-XL bus and a Local Interconnected Network (LIN) bus.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

FIG. 4 shows a table containing sample diagnostic codes for the transceiver to the microcontroller notification in accordance with one or more embodiments of the present disclosure;

FIG. 5 shows a table containing sample control codes for controlling the transceiver in accordance with one or more embodiments of the present disclosure;

Figure 1:
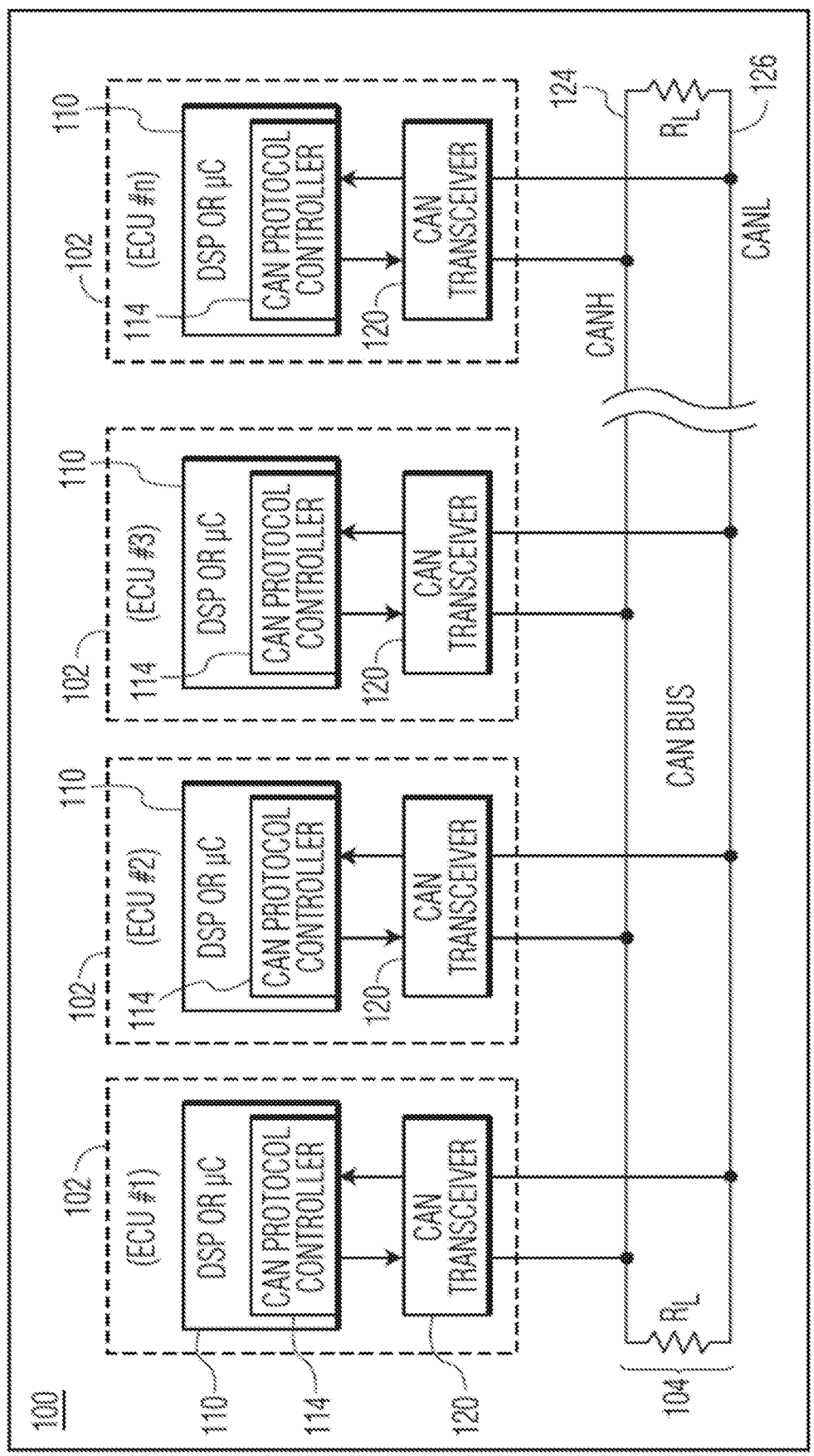
FIG. 1 depicts a CAN network including multiple electronic control units (ECUs), each connected to a CAN bus.

Note that figures are not drawn to scale. Intermediate steps between figure transitions have been omitted so as not to obfuscate the disclosure. Those intermediate steps are known to a person skilled in the art.

DETAILED DESCRIPTION

Many well-known manufacturing steps, components, and connectors have been omitted or not described in details in the description so as not to obfuscate the present disclosure.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", "one example", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

FIG. 1 depicts a CAN network 100 that includes multiple ECUs 102, also referred to as "nodes." Each node is connected to a CAN bus 104. In the embodiment of FIG. 1, each ECU includes a microcontroller 110 which has an embedded CAN protocol controller 114 and a CAN transceiver 120. The microcontrollers are typically connected to at least one device such as a sensor, an actuator, or some other control device and are programmed to determine the meaning of received messages and to generate appropriate outgoing messages. The microcontrollers, also referred to as host processors or digital signal processors (DSPs), are known in the field.

Note that the term "CAN" is being used for example only. The embodiments described herein can be applicable to other protocols such as FlexRay, CAN-FD, CAN-XL and Local Interconnected Network (LIN). Hence, if the embodiments described herein are being applied to the LIN protocol, instead of the term "CAN controller" would mean "LIN controller" or the term "CAN transceiver" would mean "LIN transceiver" and so on.

The CAN protocol controllers 114, which can be embedded within the microcontrollers 110 or external to the microcontrollers, implement data link layer operations as is known in the field. For example, in receive operations, a CAN protocol controller stores received serial bits from the transceiver until an entire message is available for fetching by the microcontroller. The CAN protocol controller can also decode the CAN frames according to the standardized frame format. In transmit operations, the CAN protocol controller receives transmit messages from the microcontroller and transmits bits serially in CAN frame format (or in the frame format of a protocol being used) to the CAN transceiver.

The CAN transceivers 120 are located between the microcontrollers 110 and the CAN bus 104 and implement physical layer operations. For example, in receive operations, a CAN transceiver converts analog differential signals from the CAN bus to serial digital signals that the CAN protocol controller can interpret. The CAN transceiver also protects the CAN protocol controller from extreme electrical conditions on the CAN bus, e.g., electrical surges. In transmit operations, the CAN transceiver converts serial digital bits received from the CAN protocol controller into analog differential signals that are sent on the CAN bus.

The CAN bus 104 carries analog differential signals and includes a CAN high (CANH) bus line 124 and a CAN low (CANL) bus line 126. The CAN bus is known in the field.

Figure 2:
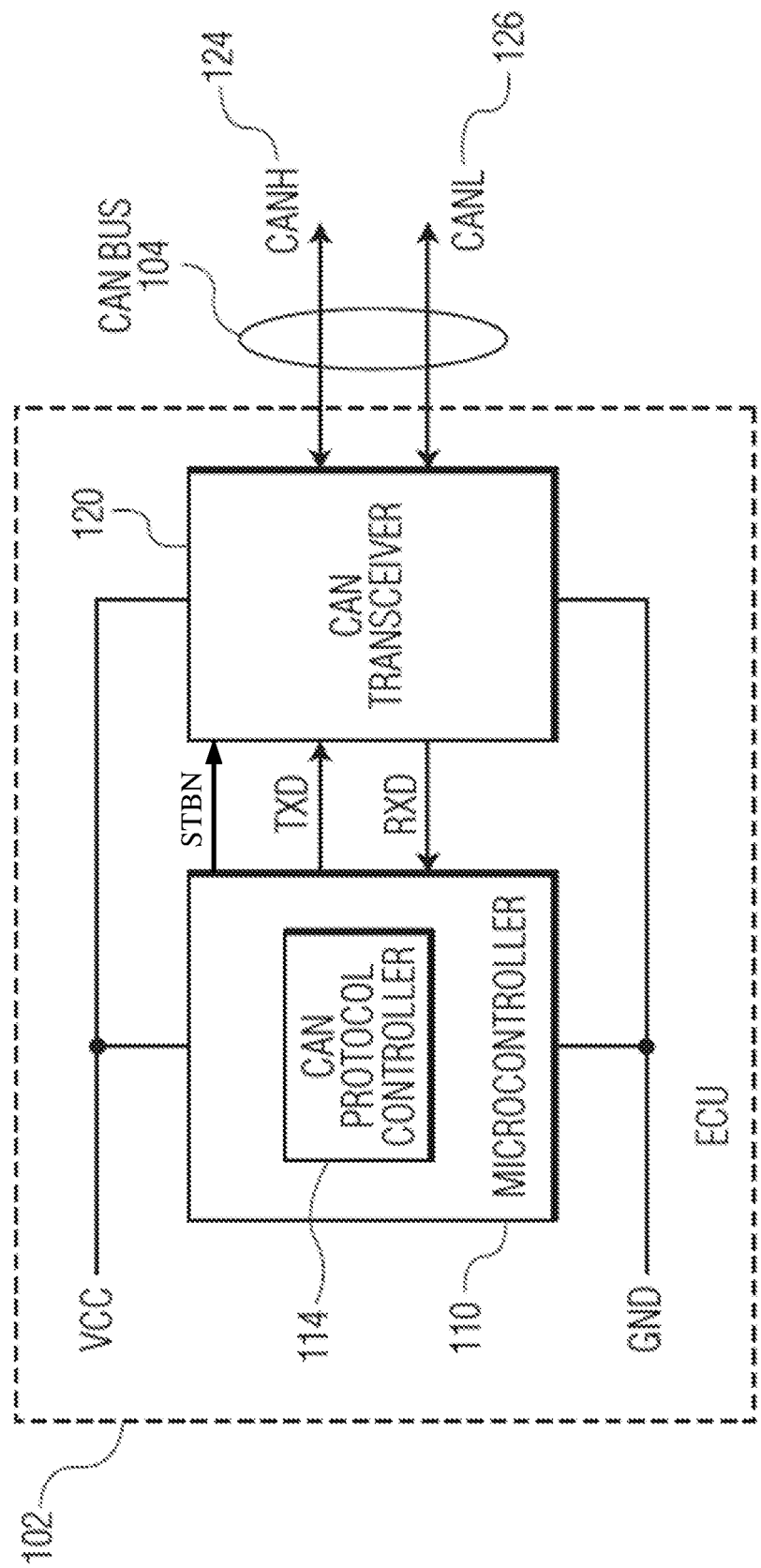
FIG. 2 depicts a transceiver coupled with a microcontroller.

FIG. 2 depicts an expanded view of one ECU 102 from FIG. 1. The microcontroller 110 and the CAN transceiver 120 of the ECU are connected between a supply voltage, VCC, and ground, GND. As illustrated in FIG. 2, data communicated from the microcontroller to the CAN transceiver is identified as transmit data (TXD) and data communicated from the CAN transceiver to the microcontroller is referred to as receive data (RXD). Data is communicated to and from the CAN bus via the CANH and CANL bus lines 124 and 126, respectively. STBN input is included to enable the microcontroller 110 to set an operational mode of the transceiver 120. The operational modes may include, listen-only mode, normal mode, standby mode and sleep mode. In some embodiments, STBN input may also be used to send other control signals to the transceiver 120. For example, the STBN input may be used to cause the transceiver 120 to execute CAN Bus diagnostic and to execute internal diagnostic.

As noted above, the CAN protocol controller 114 can be configured to support the normal mode or the flexible data rate mode. As used herein, "CAN normal mode" refers to frames that are formatted according to the ISO 11898-1 standard and "CAN FD mode" refers to frames that are formatted according to the emerging ISO 11898-1 WD standard, or an equivalent thereof. The emerging ISO 11898-1 WD standard is described in the document, CAN with Flexible Data-Rate, Specification Version 1.0, released Apr. 17, 2012, which is incorporated by reference herein.

A typical transceiver works as a data passthrough device that hands over the data received at the CAN Bus 104 to the microcontroller 110 and vice versa. However, it is desirable to use a transceiver for more than just a passthrough device. For example, in the embodiments described herein, the transceiver 120 is used for other functions such as the CAN Bus 104 diagnostic and its own internal diagnostic. The data collected through these diagnostics is transmitted to the microcontroller 110. No additional pins or data lines are used for the transmission of this additional data to the microcontroller 110 (or to receive commands from the microcontroller 110) to enable existing printed circuit board (PCB) layouts (no pinout and package change to the transceiver 120 and the microcontroller 110) to be continued to be used with simply a modification in the controller software or logic that operates the microcontroller 110. The transceiver 120 and the microcontroller 110 remain compliant to the CAN standards yet still adding features as described herein. For example, based on the diagnostic information, the microcontroller 110 may take corrective action by changing the operational mode of the transceiver 120 or notifying other ECUs about a possible error condition, etc. The corrective actions may be expanded based on the programming logic of the microcontroller 110.

To ensure that no additional data lines are needed to communicate the diagnostic information to the microcontroller 110, the transceiver 120 needs to use the existing TXDC and/or RXDC data lines. However, these data lines are already configured to be used for data communication with the CAN Bus 104. In some embodiments, when the transceiver 120 needs to transmit the diagnostic information to the microcontroller 110, the transceiver 120 waits for a predefined period of time, as agreed between the transceiver 120 and the microcontroller 110, after the last data is received from the CAN Bus 104 and then sends the diagnostic code to the microcontroller 110. The diagnostic code may include a small number of bits (e.g., 4 to 10 bits depending on the configuration). Hence transmitting these bits may only take only a small amount of time (e.g., typically a few micro-seconds). In some examples, the transceiver 120 may first send a flag data to the microcontroller 110 to indicate that the next predefined number of bits will be the diagnostic code.

Figure 3:
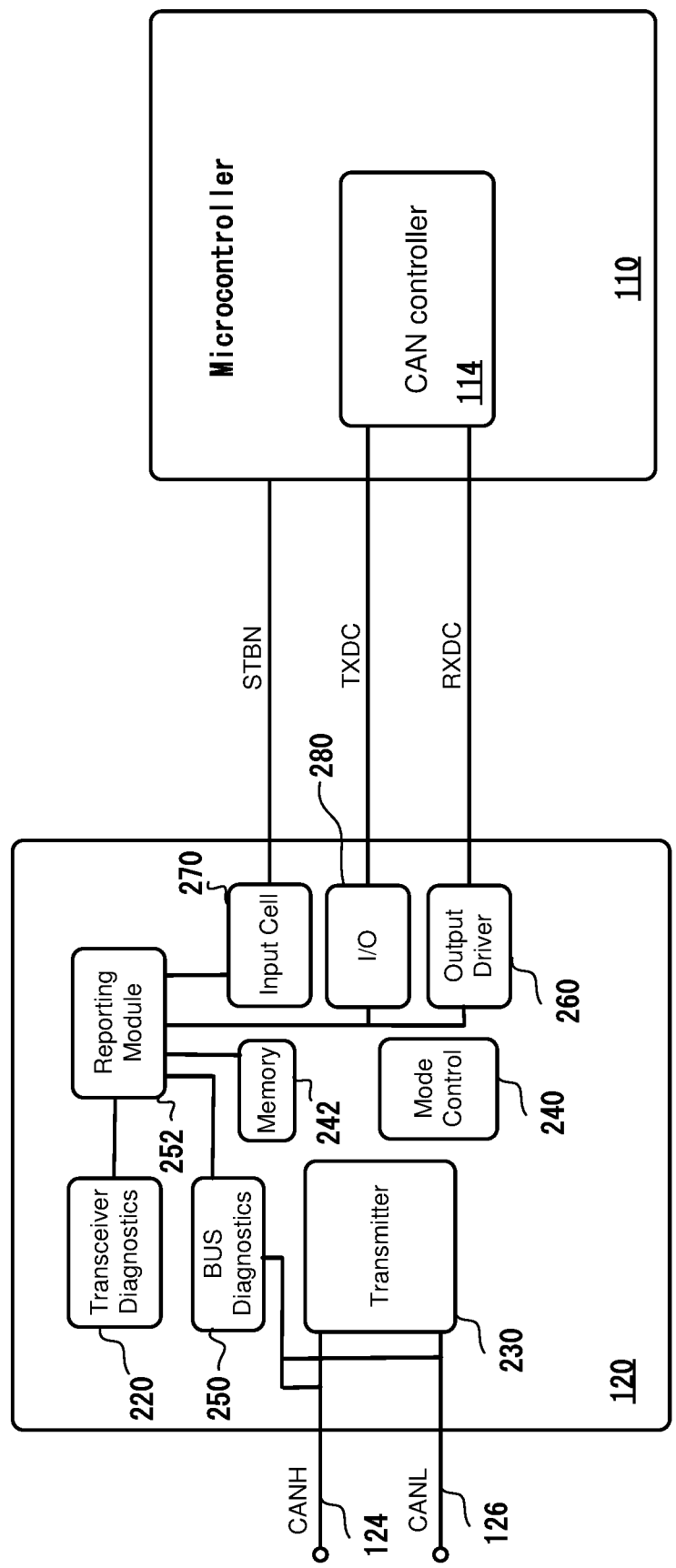
FIG. 3 illustrates a detailed view of the transceiver coupled with the microcontroller in accordance with one or more embodiments of the present disclosure.

FIG. 3 shows the transceiver 120 and the microcontroller 110 in more details, however many components (e.g., a receiver) that are not shown so as not to obfuscate the present disclosure. In some embodiments, the CAN controller or CAN protocol controller 114 may be a part of the microcontroller 110. In other embodiments, the CAN protocol controller 114 may be outside of the microcontroller 110. The transceiver 120 includes a mode control module 240 to change the mode of operation of the transceiver 120. The transceiver 120 also includes an output stage (or transmitter) 230 coupled with CANH 124 and CANL 126. A bus diagnostics module 250 is included to monitor the state of CANH 124 and CANL 126. A transceiver diagnostics module 220 is optionally included to perform internal health check of the transceiver 120. An input cell 270 is included to receive control signals on the STBN pin from the microcontroller 110. An output driver 260 is included to send data to the microcontroller via the RXDC pin. An input/output (I/O) module 280 is included to send and receive data via the TXDC pin. The I/O module 280 may include an output driver for sending the data and an input cell for receiving the data.

Note that not all components of the transceiver 120 are shown so as not to obfuscate the present disclosure. For example, in case of a secure transceiver, the transceiver 120 may include a CAN code look up table so that a transmission from a CAN node that is not authorized to send specific CAN codes may be stopped. The embodiments described herein are not dependent on a particular type of transceiver.

The bus diagnostic module 250 is configured to monitor CANH 124 and CANL 126. For example, the bus diagnostic module 250 may detect if CANH 124 and/or CANL 126 are open (e.g., not connected to the CAN bus 104), shorted together, shorted to ground, shorted to battery. In some embodiments, the diagnostics is performed at preselected regular intervals. In other embodiments, the microcontroller 110 may ask the transceiver 120 to perform diagnostics. The diagnostics results are transmitted to the microcontroller 110 for further actions. For example, to report to a user control panel or to an external reporting module. The microcontroller 110 may also take corrective actions depending on the type of error. For example, the microcontroller 110 may put the transceiver 120 in a degraded operational mode or put the transceiver 120 in a sleep mode or low power mode, etc. For example, if CANH 124 is open, the microcontroller 110 may reconfigure the transceiver 120 to operate in one way communication mode via CANL 126 only so that at least some operations may still be performed until a repair is performed.

In some examples, when the bus diagnostic module 250 detects no errors, the same is also communicated to the microcontroller 110. In some embodiments, when the microcontroller 110 does not receive the diagnostic status for a predefined time, the microcontroller 110 may assume that the transceiver 120 has failed and the microcontroller 110 reports this condition to the control panel or the user so that a corrective action may be performed. In some examples, if there a redundant component for critical safety related operations (e.g., for a critical component such as a radar in an autonomous driving vehicle), a central controller of the vehicle may reconfigure the system to use the redundant component upon receiving the report that a component is not operating within specifications or when the component has failed.

The transceiver diagnostic module 220 may be coupled with at least critical internal components of the transceiver 120 and may perform internal diagnostics on the internal components of the transceiver 120. For example, if an internal component is operating outside its present specifications, the microcontroller 110 may be notified so that the operator of the system may be notified and a repair can be performed. For example, if the internal supply voltage is too low or a component is outputting signals at a voltage lower or close to lower voltage than as specified in the component's specification, it may be a sign of aging and the microcontroller 110 needs to be notified so that the microcontroller 110 may notify the control panel or the operator of the system (e.g., a vehicle). In some example, the internal diagnostics data may also be used for failure predictions. When there are no errors detected, a "no error detected" code is sent.

A reporting module 252 may be included to provide an interface to receive control signals from the microcontroller 110 and to provide diagnostics data to the microcontroller 110. The reporting module 252 is coupled with the bus diagnostics module 250 and the transceiver diagnostics module 220. The reporting module 252 may be coupled with the STBN pin or if the microcontroller 110 is configured to send the control signal via any other pin such as TXDC or RXDC, then the reporting module 252 is coupled with that pin. The reporting module 252 is coupled with the TXDC pin depending on the configuration for sending the diagnostics data to the microcontroller 110. The reporting module 252 is configured to cause the bus diagnostics module 250 and the transceiver diagnostics module 220 to perform diagnostics operations at a predefined interval or upon receiving the status check control signal from the microcontroller 110. In some examples, the microcontroller 110 may be configured to send a specific status check control signal as described in FIG. 5.

In another embodiment, the TXDC pin may be used to send diagnostics code to the microcontroller 110. The TXDC pin is used by the microcontroller 110 to send data to the transceiver 120. Hence, when a data is received on the TXDC pin, the microcontroller 110 may assume that the received data is the diagnostics code. For example, the microcontroller 110 may send a status check control signal to the transceiver 120 and then start monitoring the TXDC pin to receive the diagnostics code. In this example, the microcontroller 110 may continue to use the RXDC pin to receive the data from the CAN bus 104 while still performing status check as described. In some example, the STBN pin may also be used for receiving control signals and sending diagnostics code.

FIG. 4 shows a table 300 that includes sample diagnostic codes. In the table 300, each diagnostic code includes five bits (b0 to b4). However, the number of bits are arbitrary and a system designer may choose a different number of bit depending on the total number of distinct messages needed to be transmitted to the microcontroller 110. Note that the error messages for each diagnostics code shown in the table 300 are for example only. A system designer may choose different codes for different type of messages. Some codes may be set as reserved for future. For example, at a future date, a transceiver-controller pair may be reprogrammed to use the reserved codes. After collecting the diagnostic data from the bus diagnostics module 250 and/or the transceiver diagnostics module 220, the reporting module 252 may preprocess the data and send the diagnostics code to the microcontroller 110. In some embodiments, one or more of the bus diagnostics module 250, the transceiver diagnostics module 220 and the reporting module 252 may be combined into one module. In some examples, at least the reporting module 252 may be implemented in software and may be executed by a transceiver microcontroller (not shown). The transceiver microcontroller may not be needed if the reporting module is implemented in hardware.

FIG. 5 shows a table 310 that includes sample control codes to be used by the microcontroller 110 to control the transceiver 120. In some embodiments, these control codes may be sent via the STBN pin. In other examples, the TXDC pin may be used for sending control codes to the transceiver. The number of bits in the control code may be decided by the system designer based on number of such codes needed.

The transceiver 120 may include a memory 242 to store the tables 300, 310. A mapping of error condition parameters may be stored with the diagnostics codes shown in the table 300. For example, a 0 voltage detection at CANL 126 may be mapped to CAN shorted to ground diagnostics code. The reporting module 252 is configured to look up an appropriate diagnostics code based on the parameter values received from the CAN bus diagnostics module 250 and/or the transceiver diagnostics module 220.

Similarly, the table 310 may be stored along possible actions to be performed for each control code in the table 310. When a status check control signal is received from the microcontroller 110, the reporting module 252 looks up the table 310 to find what operations need to be performed. For example, the shutdown transceiver control code may be mapped to the operation "shut off power supply to component x1, x2, x3" (for example only for easy understanding).

Figure 6:
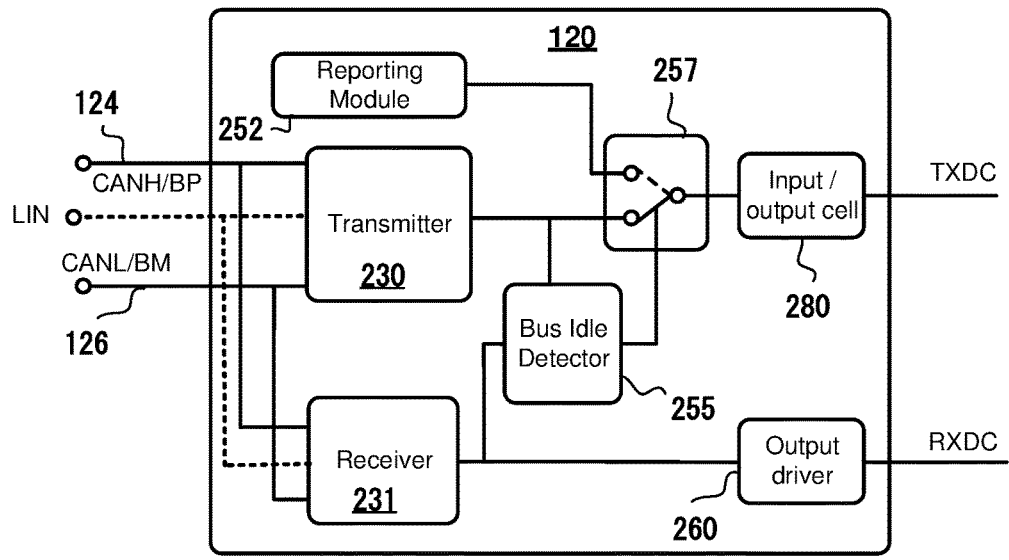
FIG. 6 illustrates a detailed view of the transceiver in accordance with one or more embodiments of the present disclosure.

FIG. 6 illustrates the transceiver 120 in another embodiment. As stated above, the transceiver 120 may be modified to be used in various communication protocols such as CAN, FlexRay and LIN. CAN and FlexRay uses two wires while LIN uses one wire for sending and receiving data. CANH 124 may be called BP 124 in FlexRay terminology. Similarly, CANL 126 may be called BM 126 in the FlexRay terminology. The LIN wire is shows as dotted lines. If the transceiver 120 is designed for the LIN protocol, instead of CANH 124 and CANL 126, the transceiver 120 will have only the LIN wire for sending/receiving data over the LIN bus.

The transceiver 120 includes a bus idle detector 255. The transceiver 120 also include a receiver 231. The bus idle detector is configured according to the protocol. Communication protocols includes a well defined packet structure and a mechanism to identify bus idle state. For example, in the CAN protocol, a continuous stream of eleven recessive bits indicates that the bus is entering idle state as no more data is pending to be received on the CANL 126. Similarly, in a FlexRay packet, each "Cycle" includes Static Segment, Dynamic Segment, Symbol Window and after these Network Idle Time. In the LIN protocol, the inter frame spaces are used between data frames and the spaces are wide enough in time to allow sending the bits of the diagnostics code to the microcontroller 110 during those inter frame spaces. These packet structures of various communication protocols are well known in the art, hence a detailed discussion is being omitted.

In some examples, the microcontroller 110 may continue to receive data on RXDC and buffer the data to be sent on TXDC for a few microseconds to give the transceiver 120 an opportunity to send the reporting data bits. Typically, sending five bits would take only microseconds, hence, no large memory is needed to buffer the data to be transmitted over the data bus. In this example, instead of using a bus idle detector 255, the switch 257 is operated based on a control signal from the microcontroller 110.

The bus idle detector 255 is configured according to the protocol of the transceiver 120 to detect bus idle state according to the predefined protocol standards. The bus idle detector 255 monitors the bus at the receiver end. In some embodiments, the bus idle detector 255 may also monitor the transmitter side bus to check if the microcontroller is still sending the data. The transceiver 120 includes a configurable input/output cell 280 and a switch 257. The input/output cell 280 includes an input cell and an output driver. In some embodiments, the switch 257 may be embodied in the input/output cell 280. When the bus idle detector 255 detects that the bus is idle, the switch 257 causes the reporting module 252 to connect to TXDC via the output driver in the input/output cell 280. As described above, the reporting module 252 may collect data to be sent to the microcontroller 110 through the bus diagnostic module 250 and/or transceiver diagnostic module 220. The microcontroller 110 also includes a similar mechanism to detect the bus idle state. The transceiver 120 and the microcontroller 110 do not have any control on the timing of the reception of the data on the bus. However, the microcontroller 110 has a control of when to send data over TXDC. When the switch 257 connects the reporting module 252 to TXDC, the microcontroller 110 configures itself to receive the data on TXDC. While the microcontroller 110 is receiving the data on TXDC, the microcontroller 110 holds on to the data to be transmitted to the bus through TXDC. While the reporting module 252 is sending data to the microcontroller 110 over TXDC, the transceiver 120 may start receiving the data via the receiver 231. However, no interruption of data buffering at the transceiver 120 is needed because the data received through the receiver 231 can be transmitted to the microcontroller 110 via the output driver 260 and RXDC. RXDC continues to work as a receiving line as usual. The reporting module 252 typically sends only a few bits as per the design of a diagnostics code. For example, in the examples herein, a five-bit protocol is being used. Transmitting these small number of bits through TXDC as described above would only take microseconds. Hence, even if the microcontroller 110 has some data to send over TXDC, the wait will be only in microseconds. Upon completion of the transmission of the reporting data or a data request, the switch 257 again connects the transmitter 230 to TXDC.

In some embodiments, after the switch 257 connects the reporting module 252 to TXDC, the transceiver 120 is configured to wait for a preselected time before start sending data to the microcontroller 110 over TXDC to account for a possible delay in the microcontroller 110 to configure itself to start receiving data over TXDC. It may be noted that the reporting module 252 is configured to accumulate data through other modules, as described above, to be sent to the microcontroller 110. The microcontroller 110 may also use TXDC to send data requests of control signals to the reporting module 252 when the switch 257 connects the reporting module to TXDC.

Figure 7:
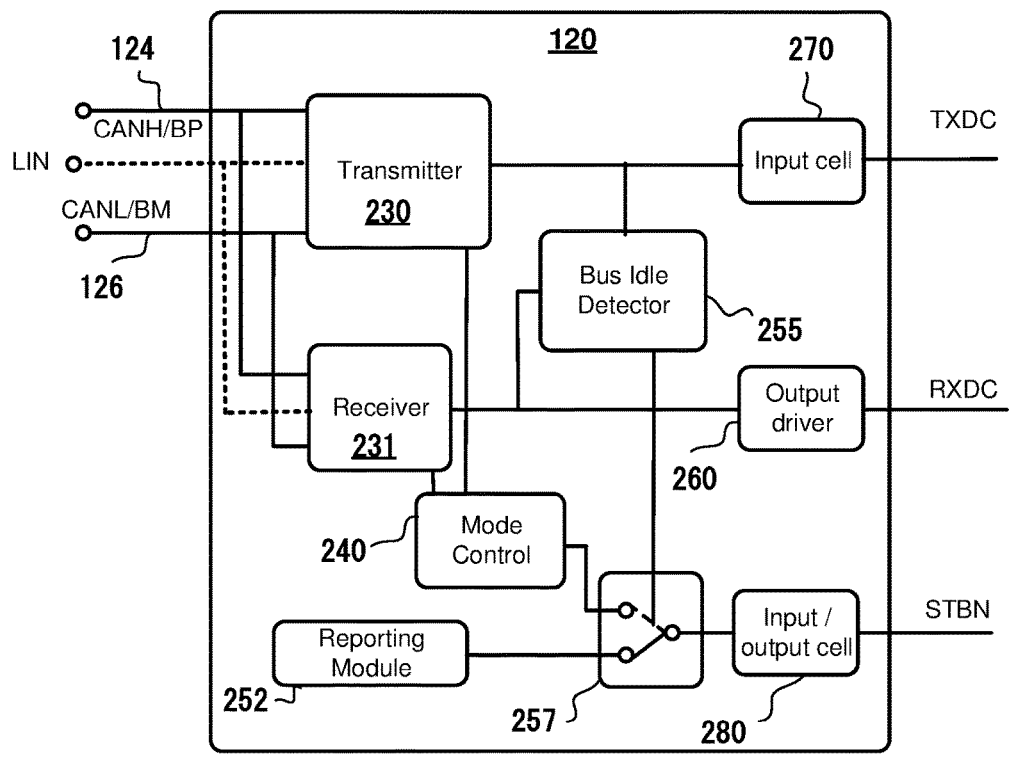
FIG. 7 illustrates a detailed view of the transceiver in accordance with one or more embodiments of the present disclosure.

FIG. 7 illustrates the transceiver 120 in yet another embodiment. In this embodiment, the STBN pin, if available, is used for sending the reporting data to the microcontroller 110 or receiving commands from the microcontroller 110. Typically, the STBN pin is coupled to an input cell only and used to receive control command such as mode control commands, as described previously. In this embodiment, the input cell is replaced by the input/output cell 280. When the bus is busy, the switch 257 connects STBN to the mode control module 240. As soon as the bus idle detector 255 detect a bus idle state, the switch 257 connects the reporting module 252 to STBN through the input/output cell 280. The microcontroller 110 is also configured to detect bus idle and to configure itself to start receiving the reporting data over STBN or sending commands or data requests to the reporting module 252 via STBN. Upon completion of the transmission the reporting data or a data request, the switch 257 again connected the mode control module 240 to STBN. In this embodiment, the transceiver 120 continues to send and receive data over the bus as usual as the operations at STBN does not interfere with the data transmission at TXDC and RXDC. In some examples, the microcontroller 110 may continue to receive data on RXDC and send data on TXDC and may send a control signal via STBN to enable the transceiver 120 to send the diagnostics data to the microcontroller 110 via STBN without waiting for the bus idle state. In this example, instead of using a bus idle detector 255, the switch 257 is operated based on a control signal from the microcontroller 110.

Some or all of these embodiments may be combined, some may be omitted altogether, and additional process steps can be added while still achieving the products described herein. Thus, the subject matter described herein can be embodied in many different variations, and all such variations are contemplated to be within the scope of what is claimed.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A transceiver configured to send and receive data over a data bus, the transceiver comprising:
    a communication port to connect to the data bus;
    a bus idle detector configured to detect when the data bus is idle;
    a TXDC interface configured to selectively receive and send data;
    an RXDC interface configured to send data; and
    a switch controlled by an output of the bus idle detector, wherein the switch is configured to cause the TXDC interface to be used for sending a data out when the bus idle detector detects that the data bus is idle.

2. The transceiver of claim 1, further includes a bus diagnostics module coupled to the communication port, wherein the bus diagnostics module is configured to analyze the communication port to detect an error and output a diagnostics code that is predefined for the detected error, wherein the diagnostic code is used in the sending data out.

3. The transceiver of claim 2, wherein if no error is detected, the bus diagnostics module is configured to output a diagnostics code that is predefined for a healthy condition.

4. The transceiver of claim 2, further including a transceiver diagnostics module configured to monitor internal components and output a diagnostics code that is predefined for detected error in one or more internal components, wherein the diagnostic code is used in the sending data out.

5. The transceiver of claim 4, wherein if no error is detected in the internal components, the transceiver diagnostics module is configured to send a diagnostics code predefined for a healthy condition of the internal components.

6. The transceiver of claim 4, further including a reporting module coupled with the transceiver diagnostics module and the bus diagnostics module to collect diagnostic data and determine a predefined diagnostics code for the collected diagnostics data.

7. The transceiver of claim 6, wherein the determine includes performing a lookup in a memory table that includes a mapping of bus parameters and diagnostic codes.

8. The transceiver of claim 1, wherein the bus idle detector is configured to detect an idle state of the data bus according to a predefined frame structure for a protocol of communication of the data bus.

9. The transceiver of claim 1, wherein the data bus is one of a controller area network (CAN) bus, a FlexRay bus, a CAN-FD bus, a CAN-XL bus and a Local Interconnected Network (LIN) bus.

10. A transceiver configured to send and receive data over a data bus, the transceiver comprising:
   a communication port to connect to the data bus;
   a bus idle detector configured to detect when the data bus is idle;
   a TXDC interface configured to receive data;
   an RXDC interface configured to send data;
   a control interface configured to selectively receive a control command and sending a data out; and
   a switch controlled by an output of the bus idle detector, the switch is configured to cause the control interface to be used for sending data out when the bus idle detector detects that the data bus is idle.

11. The transceiver of claim 10, further includes a bus diagnostics module coupled to the communication port, wherein the bus diagnostics module is configured to analyze the communication port to detect an error and output a diagnostics code that is predefined for the detected error, wherein the diagnostic code is used in the sending the data out.

12. The transceiver of claim 11, wherein if no error is detected, the bus diagnostics module is configured to output a diagnostics code that is predefined for a healthy condition.

13. The transceiver of claim 10, further including a transceiver diagnostics module configured to monitor internal components and output a diagnostics code that is predefined for detected error in one or more internal components, wherein the diagnostic code is used in the sending data out.

14. The transceiver of claim 13, wherein if no error is detected in the internal components, the transceiver diagnostics module is configured to send a diagnostics code predefined for a healthy condition of the internal components.

15. The transceiver of claim 13, further including a reporting module coupled with the transceiver diagnostics module and the bus diagnostics module to collect diagnostic data and determine a predefined diagnostics code for the collected diagnostics data.

16. The transceiver of claim 15, wherein the determine includes performing a lookup in a memory table that includes a mapping of bus parameters and diagnostic codes.

17. The transceiver of claim 10, wherein the bus idle detector is configured to detect an idle state of the data bus according to a predefined frame structure for a protocol of communication of the data bus.

18. The transceiver of claim 10, further including a mode control module to change an operational mode based on a control signal received at the control interface.

19. The transceiver of claim 18, wherein the operational mode includes one or more of a send-only mode, a listen-only mode, a normal mode, a standby mode and a sleep mode.

20. The transceiver of claim 10, wherein the data bus is one of a controller area network (CAN) bus, a FlexRay bus, a CAN-FD bus, a CAN-XL bus and a Local Interconnected Network (LIN) bus.

* * * * *